United States Patent Office 3,192,211
Patented June 29, 1965

3,192,211
5-PHENYL-5-(2-PYRAZYL)-HYDANTOIN
Antony M. Akkerman, Hendrik Kofman, and Josephus F. Michels, Amsterdam, and George de Vries, Haarlem, all of the Netherlands, assignors to N.V. Nederlandsche Combinatie voor Chemische Industrie, Amsterdam, Netherlands, a limited-liability company of the Netherlands
No Drawing. Filed Apr. 30, 1963, Ser. No. 277,035
Claims priority, application Netherlands, May 3, 1962, 278,016
6 Claims. (Cl. 260—250)

This invention relates to a new 2-substituted pyrazine derivative and to its physiologically acceptable salts.

Related compounds are disclosed in U.S. Patent 3,006,918, those compounds being described as central depressants.

It has now been found that 5-phenyl-5-(2-pyrazyl)-hydantoin also exerts a depressing action on the central nervous system and especially possesses a strong anti-convulsive activity, comparable with the same of 5,5-diphenylhydantoin.

The new compound and its physiologically acceptable salts may be prepared in a manner known per se for similar compounds. Especially suitable is the method consisting of reacting 2-benzoylpyrazine with ammoniumcarbonate and an alkalicyanide. See, for the corresponding synthesis of substituted 5-pyridyl hydantoins: U.S. Patent 2,526,231, and also Teague et al., J. Org. Chem. 23, 1578 (1958); J.A.C.S. 75, 3429 (1953); and J.A.C.S. 69, 714 (1947).

The starting compound, 2-benzoylpyrazine may be prepared by reaction of 2-cyanopyrazine with phenylmagnesiumhalide as disclosed in U.S. Patent 2,677,686.

However, it has been found that 2-benzoylpyrazine may also be prepared by the oxidation of alpha-phenyl-pyrazineacetonitrile with air, or another suitable oxygen containing gas in an inert solvent and in the presence of an alkali amide.

The alpha-phenyl-pyrazineacetonitrile in its turn, may be obtained by the method disclosed in the above mentioned U.S. Patent 3,006,918.

The following examples only serve to illustrate the invention. Variations will be apparent to one skilled in the art.

Example 1

While being continuously stirred, a solution of 17 grams of ammonium carbonate and 3.1 grams of sodium cyanide in 35 mls. of water, is added to a solution of 9.5 grams of 2-benzoylpyrazine in 60 mls. of ethanol (96%). Thereupon, the mixture is heated to 50–60° C. and stirring is continued for eight hours.

After cooling, the ethanol is removed by distillation, and the remaining solution is acidified with 4 N hydrochloric acid. The precipitate formed is collected on a filter and then dissolved in a 10% sodium carbonate solution. The solution obtained is treated with charcoal and neutralized with acetic acid, whereupon a crystalline precipitate appears consisting of 3.3 grams of 5-phenyl-5-(2-pyrazyl)-hydantoin, which melts at 201–203° C. The compound may be converted into its alkali salts in ways that are known per se for similar compounds.

Example 2

A solution containing 4.6 grams of sodium amide and 19.6 grams of alpha-phenyl-pyrazineacetonitrile in 200 mls. of dry dioxan is refluxed for 3 hours with continuous stirring.

After cooling, a stream of dried air is sucked through the solution during 20 hours. Hereupon 10 mls. of methanol followed by 10 mls. of water are added to the solution. The reaction mixture is poured into water and the solution extracted three times with chloroform.

The combined chloroform extracts are washed with water, dried over magnesium sulfate and the solvent is removed in vacuo.

The solid residue is recrystallized from petroleum ether. The melting point of the 2-benzoylpyrazine thus obtained is 51–53° C. Yield 74%.

What is claimed is:

1. A compound selected from the group consisting of 5-phenyl-5-(2-pyrazyl)-hydantoin and its physiologically acceptable salts.

2. A method of preparing 2-benzoylpyrazine which comprises oxidizing alpha-phenyl-pyrazineacetonitrile with an oxygen containing gas in an inert solvent and in the presence of an alkali amide.

3. A method according to claim 2, in which the inert solvent is dioxan.

4. A method according to claim 3, in which the alkali amide is sodium amide.

5. A method according to claim 2, in which the alkali amide is sodium amide.

6. A method according to claim 2, in which said oxygen containing gas is air.

No references cited.

IRVING MARCUS, *Primary Examiner.*

NICHOLAS S. RIZZO, *Examiner.*